US006834358B2

(12) United States Patent
Korenevsky et al.

(10) Patent No.: US 6,834,358 B2
(45) Date of Patent: Dec. 21, 2004

(54) RESTARTABLE DATABASE LOADS USING PARALLEL DATA STREAMS

(75) Inventors: Gregory Korenevsky, Manhattan Beach, CA (US); Alex P. Yung, Walnut, CA (US)

(73) Assignee: NCR Corporation, Dayton, OH (US)

(*) Notice: Subject to any disclaimer, the term of this patent is extended or adjusted under 35 U.S.C. 154(b) by 439 days.

(21) Appl. No.: 09/819,275

(22) Filed: Mar. 28, 2001

(65) Prior Publication Data

US 2002/0174379 A1 Nov. 21, 2002

(51) Int. Cl.$^7$ ................................................ G06F 11/00
(52) U.S. Cl. ...................................... 714/15; 714/12
(58) Field of Search ............................... 714/11, 12, 13, 714/15, 16, 19

(56) References Cited

U.S. PATENT DOCUMENTS

| | | | | |
|---|---|---|---|---|
| 5,301,309 A | * | 4/1994 | Sugano | 714/12 |
| 5,551,043 A | * | 8/1996 | Crump et al. | 713/323 |
| 5,802,267 A | * | 9/1998 | Shirakihara et al. | 714/15 |
| 5,819,021 A | * | 10/1998 | Stanfill et al. | 714/15 |
| 5,912,906 A | * | 6/1999 | Wu et al. | 714/763 |
| 5,922,078 A | * | 7/1999 | Hirayama et al. | 714/16 |
| 5,983,361 A | * | 11/1999 | Lee et al. | 714/19 |
| 6,393,583 B1 | * | 5/2002 | Meth et al. | 714/12 |
| 6,519,712 B1 | * | 2/2003 | Kim et al. | 714/15 |

OTHER PUBLICATIONS

Codd, E.F.; Relational Database: A Practical Foundation for Productivity; Communications of the ACM; Feb. 1982; pp. 109–117; vol. 25, No. 2.

Foster, Ian; Section 1.3—A Parallel Programming Model; Designing and Building Parallel Programs: Concepts and Tools for Parallel Software Engineering; 1995; pp. 27–81; Addison–Wesley.

Foster, Ian; Section 2—Designing Parallel Algorithms; Designing and Building Parallel Programs: Concepts and Tools for Parallel Software Engineering; 1995; pp. 27–81; Addison–Wesley.

Foster, Ian; Section—Quantitative Basis for Design; Designing and Building Parallel Programs; Concepts and Tool for Parallel Software Engineering; 1995; pp. 83–135; Addison–Wesley.

* cited by examiner

Primary Examiner—Scott Baderman
Assistant Examiner—Joshua Lohn
(74) Attorney, Agent, or Firm—Baker Botts L.L.P.; John D. Cowart

(57) ABSTRACT

A method and computer program for reducing the restart time for a parallel application are disclosed. The parallel application includes a plurality of parallel operators. The method includes repeating the following: setting a time interval to a next checkpoint; waiting until the time interval expires; sending checkpoint requests to each of the plurality of parallel operators; and receiving and processing messages from one or more of the plurality of parallel operators. The method also includes receiving a checkpoint request message on a control data stream, waiting to enter a state suitable for checkpointing, and sending a response message on the control data stream.

7 Claims, 12 Drawing Sheets

(CHECKPOINT PROCESSING)

(NORMAL PROCESSING)

(CHECKPOINT REJECTED)

(RECOVERABLE ERROR)

(NON-RECOVERABLE ERROR)

(RE-START)

RESTARTABLE DATABASE LOADS USING PARALLEL DATA STREAMS

BACKGROUND

Relational Database Management Systems (RDBMS) have become an integral part of enterprise information processing infrastructures throughout the world. An RDBMS 100, as shown in FIG. 1, maintains relational data structures called "relational tables," or simply "tables" 105. Tables 105 consist of related data values known as "columns" (or "attributes") which form "rows" (or "tuples").

An RDBMS "server" 110 is a hardware and/or software entity responsible for supporting the relational paradigm. As its name implies, the RDBMS server provides services to other programs, i.e., it stores, retrieves, organizes and manages data. A software program that uses the services provided by the RDBMS Server is known as a "client" 115.

In many cases, an enterprise will store real-time data in an operational data store (ODS) 200, illustrated in FIG. 2, which is designed to efficiently handle a large number of small transactions, such as sales transactions, in a short amount of time. If the enterprises wishes to perform analysis of the data stored in the ODS, it may move the data to a data warehouse 205, which is designed to handle a relatively small number of very large transactions that require reasonable, but not necessarily instantaneous response times.

To accomplish this, data is "imported," or "loaded" (block 210) from various external sources, such as the ODS 200, into the data warehouse 205. Once the data is inside the data warehouse 205, it can be manipulated and queried. Similarly, the data is sometimes "unloaded" or "exported" from the data warehouse 205 into the ODS 200 or into another data store. Since both load and unload processes share many similarities, in terms of the processing they perform, they will be referred to hereinafter as "database loads" or "loads."

A database load is typically performed by a special purpose program called a "utility." In most cases the time required to perform a database load is directly proportional to the amount of data being transferred. Consequently, loading or unloading "Very Large Databases" (i.e. databases containing many gigabytes of data) creates an additional problem—increased risk of failure. The longer a given load runs, the higher the probability is that it will be unexpectedly interrupted by a sudden hardware or software failure on either the client 115 or the server 110. If such a failure occurs, some or all of the data being loaded or unloaded may be lost or unsuitable for use and it may be necessary to restart the load or unload process.

"Parallel Processing," a computing technique in which computations are performed simultaneously by multiple computing resources, can reduce the amount of time necessary to perform a load by distributing the processing associated with the load across a number of processors. Reducing the load time reduces the probability of failure. Even using parallel processing, however, the amount of data is still very large and errors are still possible.

One traditional approach to handling errors in non-parallel systems is called "mini-batch" or "checkpointing." Using this approach, the overall processing time for a task is divided into a set of intervals. At the end of each interval, the task enters a "restartable state" called a "checkpoint" and makes a permanent record of this fact. A restartable state is a program state from which processing can be resumed as if it had never been interrupted. If processing is interrupted, it can be resumed from the most recent successful checkpoint without introducing any errors into the final result.

Applying checkpointing to a parallel process is a significant challenge.

SUMMARY

In general, in one aspect, the invention features a method for reducing the restart time for a parallel application. The parallel application includes a plurality of parallel operators. The method includes repeating the following: setting a time interval to a next checkpoint; waiting until the time interval expires; sending checkpoint requests to each of the plurality of parallel operators; and receiving and processing messages from one or more of the plurality of parallel operators.

Implementations of the invention may include one or more of the following. Before entering the repeat loop the method may include receiving a ready message from each of the plurality of parallel operators indicating the parallel operator that originated the message is ready to accept checkpoint requests.

Receiving and processing messages from one or more of the plurality of parallel operators may include receiving a checkpoint information message, including checkpoint information, from one of the plurality of parallel operators and storing the checkpoint information, along with an identifier for the one of the parallel operators, in a checkpoint data store. Receiving and processing messages from one or more of the plurality of parallel operators may include receiving a ready to proceed message from one of the plurality of parallel operators, marking the one of the plurality of parallel operators as ready to proceed, and, if all of the plurality of parallel operators has been marked as ready to proceed, marking a current checkpoint as good. Receiving and processing messages from one or more of the plurality of parallel operators may include receiving a checkpoint reject message from one of the plurality of parallel operators, sending abandon checkpointing messages to the plurality of parallel operators, and scheduling a new checkpoint. Receiving and processing messages from one or more of the plurality of parallel operators may include receiving a recoverable error message from one or more of the plurality of parallel operators, sending abandon checkpointing messages to the plurality of parallel operators, waiting for ready messages from all of the plurality of parallel operators, and scheduling a new checkpoint. Receiving and processing messages from one or more of the plurality of parallel operators may include receiving a non-recoverable error message from one of the plurality of parallel operators, and sending terminate messages to the plurality of parallel operators.

The method may further include restarting the plurality of parallel operators. Restarting may include sending initiate restart messages to the plurality of parallel processors and processing restart messages from the plurality of parallel processors. Processing restart messages may include receiving an information request message from one or more of the plurality of parallel operators, retrieving checkpoint information regarding the one or more of the plurality of parallel operators from the checkpoint data store, and sending the retrieved information to the one of the plurality of parallel operators. Processing restart messages may include receiving a ready to proceed message from one of the plurality of parallel operators, marking the one of the plurality of parallel operators as ready to proceed, and sending proceed messages to all of the plurality of parallel operators if all of the plurality of parallel operators have been marked as ready to proceed. Processing restart messages may comprise receiving an error message from one or more of the plurality of parallel operators and terminating the processing of the plurality of parallel operators.

In general, in another aspect, the invention features a method for one of a plurality of parallel operators to record its state. The method includes receiving a checkpoint request message on a control data stream, waiting to enter a state suitable for checkpointing, and sending a response message on the control data stream.

Implementations of the invention may include one or more of the following. Waiting to enter a state suitable for checkpointing comprises receiving a checkpoint marker on an input data stream, finishing writing data to an output data stream, and sending a checkpoint marker on the output data stream. Waiting to enter a state suitable for checkpointing may comprise waiting for all of the parallel operator's outstanding input/output requests to be processed.

The method may further comprise determining that the parallel operator is not in a state suitable for checkpointing and sending a response message on the control data stream may include sending a checkpoint reject message on the control data stream. The method may further comprise experiencing a recoverable error. Sending a response message on the control data stream may include sending a recoverable error message on the control data stream. The method may further comprise experiencing a non-recoverable error. Sending a response message on the control data stream may include sending a non-recoverable error message on the control data stream.

In general, in another aspect, the invention features a computer program, stored on a tangible storage medium, for use in reducing the restart time for a parallel application. The parallel application includes a plurality of parallel operators. The computer program includes a CRCF component which includes executable instructions that cause a computer to repeat the following: set a time interval to a next checkpoint, wait until the time interval expires, send checkpoint requests to the plurality of parallel operators, and receive and process messages from one or more of the plurality of parallel operators. The computer program also includes a plurality of parallel components, each of which is associated with one of the plurality of parallel operators, and each of which includes executable instructions that cause a computer to: receive a checkpoint request message from the CRCF, wait to enter a state suitable for checkpointing, and send a checkpoint response message to the CRCF.

Implementations of the invention may include one or more of the following. Each of the parallel components may include executable instructions that cause a computer to determine that the parallel operator is not in a state suitable for checkpointing. In sending a response message to the CRCF, the parallel component associated with that parallel operator may cause the computer to send a checkpoint reject message to the CRCF. In receiving and processing messages from one or more of the plurality of parallel operators, the CRCF may cause the computer to receive the checkpoint reject message and send abandon checkpoint messages to the plurality of parallel operators in response to the checkpoint reject message. Each of the parallel components may include executable instructions that cause a computer to determine that one or more of the parallel operators has experienced a recoverable error. In sending a response message to the CRCF, the parallel component or components associated with the one or more parallel operator that experienced the recoverable error or errors may cause the computer to send a recoverable error message to the CRCF, proceed with recovery, and send a ready message to the CRCF. In receiving and processing messages from one or more of the plurality of parallel operators, the CRCF may cause the computer to: receive the recoverable error message, send abandon checkpoint messages to the plurality of parallel operators in response to the recoverable error message, wait for the ready messages, receive the ready messages, and schedule a checkpoint.

Each of the parallel components may include executable instructions that cause a computer to determine that one of the parallel operators has experienced a non-recoverable error. In sending a response message to the CRCF, the parallel component associated with the one parallel operator may cause the computer to send a non-recoverable error message to the CRCF. In receiving and processing messages from one or more of the plurality of parallel operators, the CRCF may cause the computer to receive the non-recoverable error message and send stop processing messages to the plurality of parallel operators in response to the non-recoverable error message. The CRCF may further include executable instructions that cause the computer to send an initiate restart message to one of the plurality of parallel operators. In response to the restart message from the CRCF, the parallel component associated with the one parallel operator may cause the computer to send an information request to the CRCF. In responding to the information request, the CRCF may cause the computer to retrieve checkpoint information regarding the one parallel operator from a checkpoint data store and send the checkpoint information to the one parallel operator. The parallel component associated with one of the parallel operators may further comprise executable instructions that cause the computer to send a ready to proceed message to the CRCF. In responding to the ready to proceed message, the CRCF may cause the computer to mark the one parallel operator as ready to proceed and, if all of the plurality of parallel operators have been marked as ready to proceed, send proceed messages to all of the plurality of parallel operators. The parallel component associated with one of the parallel operators may further comprise executable instructions that cause the computer to send an error message to the CRCF. In responding to the error message, the CRCF may cause the computer to send messages to all of the parallel operators to terminate their processing.

DETAILED DESCRIPTION

Figure 1:
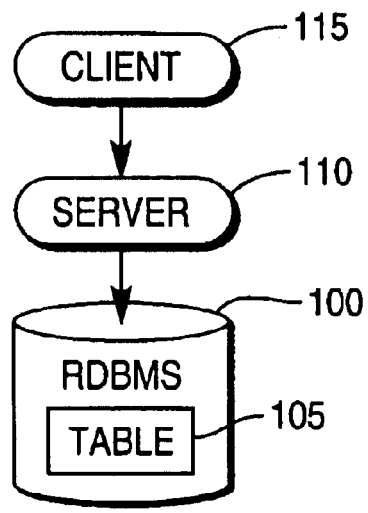
FIG. 1 is a block diagram of a prior art system incorporating an RDBMS.
Figure 2:
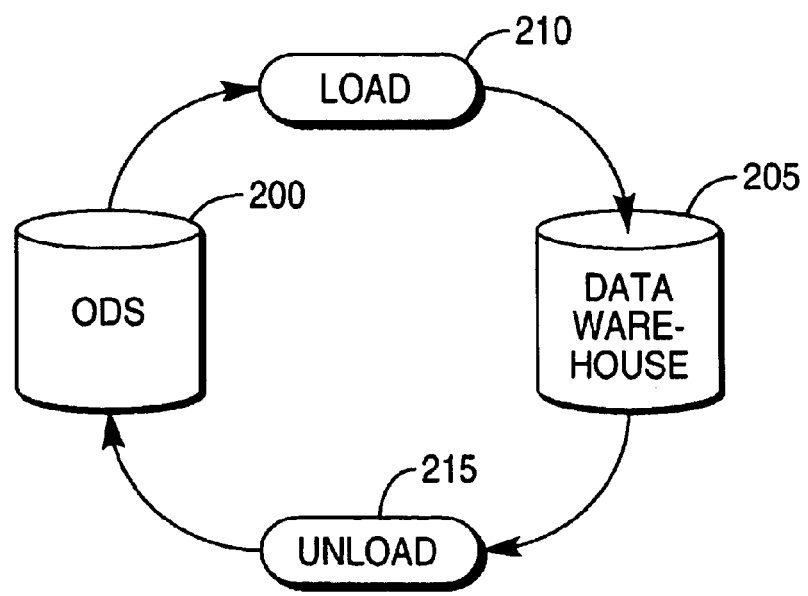
FIG. 2 is a flow chart of prior art data base load and unload processes.

The following definitions, abbreviations, and phrases, which are used in this application, are not intended to limit the scope of the invention in any way. They are provided for the benefit and convenience of the reader:

1. "Relational tables," or simply "tables," are conceptual relational data structures maintained by the RDBMS.
2. Tables consist of related data values known as "columns" (or "attributes") which form "rows" (or "tuples").
3. An RDBMS Server is a hardware and/or software entity responsible for supporting the relational paradigm. As its name implies, the RDBMS server provides miscellaneous services that enable storage, retrieval, organization and management of data.
4. A software and/or hardware entity that utilizes the services provided by the RDBMS server is known as a client.

A database load process usually:
1. Introduces data into newly created tables. The tables are initially created empty and require an outside process to populate them with data. This type of load is commonly known as an "initial load."
2. Introduces new data into previously created (existing) tables. This type of load is sometimes referred to as an "append."
3. Modifies data in existing tables through one of the following operations:

INSERT-add new rows to the tables

UPDATE-modify current column values

DELETE-delete existing table rows

This type of load is sometimes called an "update."

A "database export" process usually extracts data from existing tables and copies it to an external data store.

| | |
|---|---|
| DBMS | Database Management Systems |
| RDBMS | Relational Database Management Systems |
| Parallel Computer | A set of processors which can work cooperatively to solve a computational problem |
| Parallel Program | A program designed to take advantage of the parallel processing capability of the underlying hardware |
| Data Partitioning | Division of a data source into multiple disjoint partitions |
| Functional Partitioning | Division of a process into multiple processes along functional boundaries |
| Functional Parallelism | see Functional Partitioning |
| Pipelining | see Functional Partitioning |
| Scalability | The ability of a program to take advantage of additional computing resources, such as I/O devices, CPUs, memory, network connections, etc., to accommodate an increase in computational load |
| Database Load | The process of transferring data from an external source into a DBMS |
| Database Unload | The process of transferring data from a DBMS to an external target. The opposite of Database Load |
| State | A representation of a program's execution at a given point in time. |
| State Transition | A process whereby the program enters a new state |
| Checkpoint | Program's state information recorded externally |
| Checkpointing | A technique designed to reduce risk due to failure |
| Restart | A process whereby a previously terminated program resumes its processing. |
| Collective State | A combined state of a parallel program |
| PEI | Parallel Execution Infrastructure |
| ADSF | Asynchronous Data Stream Facility |
| CRCF | Checkpoint and Restart Coordination Facility |
| MPP | Massively Parallel Processors |
| Parallel Instance | A copy of a program running as a separate processes |
| I/O | Input/Output |
| OLTP | On-Line Transaction Processing |
| Distributed Process | A logical process carried out by several distinct processes |
| DSM | Distributed State Machine |
| Dialog | A multiple data interchange between programs within a given context |
| CPM | Checkpoint Partitioning Mark |
| API | Application Programming Interface |
| Virtual Table | A table that does not exist in its own right, except its definition. |

Although parallel processing has been successfully used for database loading, and error handling approaches such as checkpointing have been successfully used to recover conventional database load utilities from failures, combining both of these techniques in a single program—a restartable parallel database utility—presents its own set of challenges. Below are some of the issues:

1. Failure Detection

As mentioned above, many parallel programs consist of a set of independently executing processes. A given failure may not affect all the processes in the same way. For example, the failure may affect only one process, or a subset of processes. While the affected processes may terminate, others belonging to the same program may continue executing. In this case, the final overall result produced by the parallel program may be incomplete or incorrect. Therefore, it is important for a parallel program as a whole to sense the failure of any one of its constituent processes, so that it can carry out the appropriate error recovery.

2. Consistency of Checkpoints

Checkpointing works well for conventional sequential programs because a checkpoint needs to capture the state of only one process. In contrast, a parallel program consists of two or more such processes, each with its own state. Further, due to the non-deterministic (unpredictable) way most host operating systems handle such processes, each one may perform its checkpoint at a different time. Since in almost all cases processes share data, restarting each process individually using only its own checkpoint information would not produce the correct overall result for the parallel program. This means a parallel program must coordinate checkpointing of its individual processes.

3. Resumption After a Failure

This issue is related to the checkpoint consistency issue discussed above. Not only should a parallel program coordinate the checkpointing of its constituent processes, it should also coordinate the resumption of processing after a failure. Resuming some processes and not resuming others may produce an erroneous result. If processes share data, allowing some to proceed while others are still recovering from an error may also produce an error.

All of these considerations suggest that a restartable parallel database utility should have coordination capabilities that are not normally found in regular parallel programs or restartable non-parallel programs.

Checkpointing

As discussed above, checkpointing is a technique that enables programs to recover from unexpected failures, such as unexpected power loss, severe hardware malfunctions, etc., not easily handled by other means. Without checkpointing, such failures may require a failed program to be re-executed from the very beginning. For long-running tasks, such as many loads and unloads, this may result in hours of lost computing time and missed deadlines. Checkpointing makes it possible to control this situation.

Checkpointing is based on a notion of a program's "state," which, in one example, can be defined as a combination of some or all of the following:

- The current instruction being executed
- The next instruction to be executed
- All internal and external variables
- The call stack
- Dynamic storage allocated by the program
- External queues, e.g., I/O request queues
- The states of external inputs and outputs
- The states of other external resources, e.g., communication links, semaphores, etc.

During execution a program transitions from one state to another. Checkpointing records a program's current state to an external persistent storage location, such as a file. To simplify this task, checkpointing is preferably performed when a minimum amount of information is required to describe the program's state. The program records its state information, verifies that the store occurred, and then proceeds with the rest of its processing.

State information recorded in this manner is known as a "checkpoint." Checkpoints can be taken at regular time intervals, which are called "checkpointing intervals." When an unexpected failure occurs, processing can be resumed, or "re-started," from the most recent checkpoint that occurred before the failure. During re-start, the program reads the most recent valid checkpoint, set its state according to the information it contains, and proceeds with the rest of the processing. In effect, the processing continues as if it were never interrupted.

Checkpointing makes it possible to control the maximum amount of time necessary to re-run a failed program, since that time would not exceed the size of the most recent checkpointing interval. The downside of checkpointing is that it imposes a certain amount of processing overhead, thereby slowing down program execution. However, since the overhead is proportional to the checkpointing frequency, the user can choose the checkpointing interval that represents the best compromise between increased overhead and potential re-run time.

Checkpointing in Parallel Application

A parallel "application" executes as a set of distinct "programs," each having its own state. Therefore, in general, at any given point in time such an application cannot be described in terms of a single-process state, but instead requires a "collective state." A collective state is a combination of the states of all the participating programs. A parallel application which contains N programs, where each program can have M states, can have N*M collective states.

Checkpointing a parallel application requires that the collective state of the application be recorded. Since a parallel application's constituent programs execute independently, typically their states and state transitions are independent of the states and transitions of other programs. As a result, the collective state of a parallel application can be difficult to determine at any given point in time, unless the programs are somehow synchronized.

Further, from time to time the programs may intercommunicate and exchange data with each other. For example, one program may supply data required by another program. The program that supplies data, in effect, becomes an external resource for the program that consumes data. In order to record its own state, the consumer program must also record some state information related to the producer program. To do that, the programs may have to coordinate their processing. In essence, in this situation each program cannot perform its checkpointing independently, but instead needs to coordinate it with other programs in an application.

Checkpointing Facilities

A database load utility, which combines parallel processing with checkpointing, includes the following components:

The utility programs themselves, i.e. the programs which carry out database loading and unloading functions. These programs are capable of running in a parallel fashion.

An integrated set of facilities, called the Parallel Execution Infrastructure (PEI), which includes the following:

A Parallel Execution Facility, called PIPC, which provides the following low-level functions:
Program Launch and Monitoring
Inter-Process Synchronization and Serialization
Inter-Process Data Transfer
Asynchronous Data Streams (ADS) used for exchanging data between the processes.
Job Execution Control and Monitoring
A Checkpoint-Restart Coordination Facility (CRCF)
An Application Programming Interface, or API, which provides the interface to the above facilities.

The API also defines a protocol that dictates the sequence and the timing of requests and responses. The parallel programs are designed to operate and communicate in accordance with this protocol.

The Parallel Execution Infrastructure is initialized before it runs any parallel utilities. It can be started independently on a single multi-processing node, or span several processing nodes, including massively parallel processors ("MPP") and network-connected processors ("network clusters"), using the nomenclature associated with the Teradata Active Data Warehousing System available from NCR Corporation.

Parallel utility program execution is initiated by submitting a request to the PEI to create a "Parallel Application," which represents a particular execution of a parallel program. Multiple distinct executions of a given parallel program correspond to multiple distinct Parallel Applications within PEI. After a Parallel Application is created, it can be referred to by name in subsequent requests to the PEI. Once a Parallel Application is created, additional requests are submitted to the PEI instructing it to launch the programs for a given parallel application.

Parallel database utility programs execute as parallel applications within the PEI. The PEI provides low-level, system-oriented services, while the utilities implement higher-level, database-oriented functions.

Operators

Internally, the utilities are structured as a set of "operators" that can create, modify and consume "virtual table" rows. Each operator is designed to perform a specific function, e.g. retrieve rows of data from external files, store rows of data in database tables, evaluate logical expressions involving column values, etc. "Virtual tables" represent an operator's inputs and outputs.

Operators are divided into four general categories based on the function they perform:

Producers—create "virtual table" rows by, e.g., reading external data sources, such as files Consumers—read the "virtual table" rows and store them in external data sinks, e.g., DBMS tables Filters—read "virtual table" rows and use them to produce other "virtual table" rows Standalone—neither create nor read "virtual table" rows Since producers, consumers and filters can either create or read virtual tables, they can be combined by interconnection of their inputs and outputs in the following ways:

Producer—Consumer

Producer—Filter—Consumer

Producer—Filter—Filter—. . . —Filter—Consumer

Data Streams

Asynchronous Data Streams are used to interconnect the operators. They enable the flow of data between the operators. A data stream has an origin and a destination. In order for the data to flow through the data stream, it has to be opened both at the origin and at the destination. Once the data stream is open, the origin and the destination programs can issue read and write requests to initiate the transfer of data. In one example, the read and write operations can be issued in any order, i.e. in a non-synchronized manner, or "asynchronously." For this reason, these data streams are referred to as "asynchronous." The data streams provide the buffering mechanism that enables each operator to execute independently of and in parallel with the other operators that either consume or provide its data. Further, since operators interchange data only through the data streams, they are not concerned with the specifics of the interconnection, and can be arranged in many different sequences to accomplish a wide variety of tasks.

Another benefit of using asynchronous data streams is that they obviate the need for intermediate data stores, which typically results in faster execution times and helps avoid various system limitations, such as limitations on maximum file size. For example, a utility operator can export data from an OLTP DBMS server, send it via the data stream to a filtering and conditioning operator, which, in turn, can send it to a data warehouse loading operator. The entire process can be performed in a single step without storing intermediate results on external media, resulting in faster execution time.

In addition to transferring data between the operators, the data streams make it possible to inter-connect multiple operators, to merge their outputs into a single data stream or to split it into multiple data streams. The actual mechanism underlying the data streams varies from one architecture to another and includes various memory-based and communication protocol-based implementations.

Checkpoint-Restart Coordination Facility

From time to time the operators may need to coordinate their processing, e.g. during checkpoint processing. A Checkpoint-Restart Coordination Facility ("CRCF") is provided to enable this coordination. The CRCF works by means of "executors," which are special components designed to control operator execution.

The CRCF includes a central coordinator, which supervises a given coordination activity, such as the processing of a checkpoint. The coordinator maintains two-way communications with executors, which, in turn, relay requests to the operators. The sequence and the timing of the requests are dictated by the coordination protocol, which is implemented by all the components: the CRCF, the executors, the operators and the asynchronous data streams. The flow of coordination requests and responses forms a "control data stream."

Figure 3:
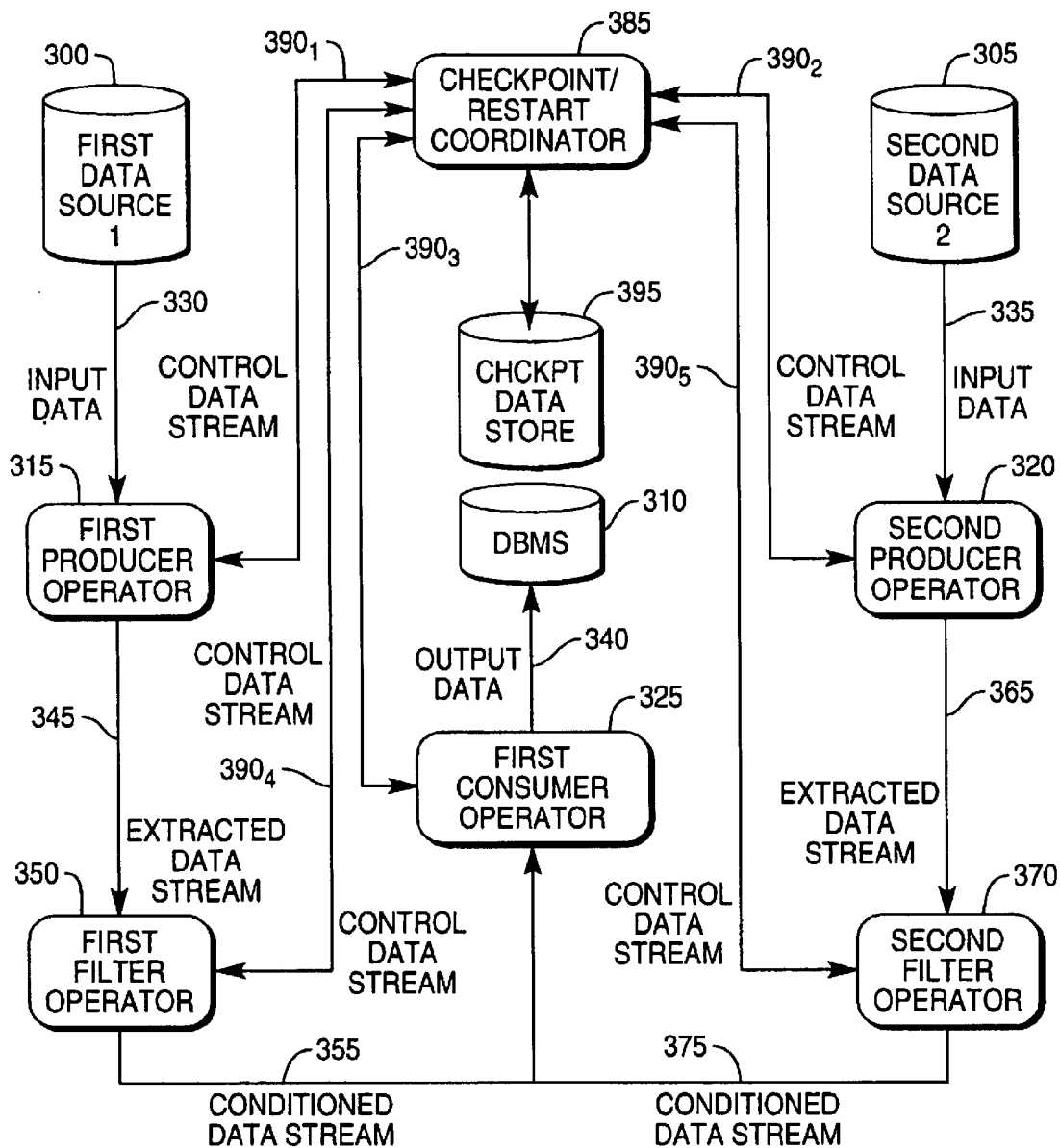
FIG. 3 is a block diagram of a database load and unload system.

An example parallel load utility, illustrated in FIG. 3, is used to load data from a first data source 300 and a second data source 305 to a DBMS 310. A first producer operator 315 provides an interface to the first data source 300, a second producer operator 320 provides an interface to the second data source 305, and a first consumer operator 325 provides an interface to the DBMS 310.

A first producer operator 315 extracts data from a first data source 300 and writes it to a first extracted data stream 345; a second producer operator 320 extracts data from a second data source 305 and writes it to a second extracted data stream 365. A first consumer operator 325 reads data from conditioned data streams 355 and 375 and loads it into the DBMS 310.

A first extracted data stream 345 is opened between the first producer operator 315 and a first filter operator 350 and a first conditioned data stream 355, which carries a filtered version of the first extracted data stream 345, is opened between the first filter operator 350 and the first consumer operator 325. A second extracted data stream 365 is opened between the second producer operator 320 and a second filter operator 370 and a second conditioned data stream 375, which carries a filtered version of the second extracted data stream 365, is opened between the second filter operator 370 and the first consumer operator 325. The first consumer operator conceptually combines the first conditioned data stream 355 and the second conditioned data stream 375.

To load data from the first data source 300 and the second data source 305 to the DBMS 310, data is extracted from the first data source 300 through the first producer operator 315, and filtered by the first filter operator 350. That data is combined by the first consumer operator 325 with data extracted from the second data source 305 by the second producer operator 320 and filtered by the second filter operator 370. The combined data stream is stored in the DBMS through the first consumer operator 325.

A checkpoint-restart coordinator (CRCF) 385 coordinates checkpointing and restart operations. Control data streams $390_1 \ldots _5$ are opened to accommodate checkpointing information that passes between the CRCF 385 and the first producer operator 315, the second producer operator 320, the first consumer operator 325, the first filter operator 350 and the second filter operator 370, respectively. A checkpoint data store 395 stores the checkpoint data.

Normal Execution and Checkpointing

Figure 4:
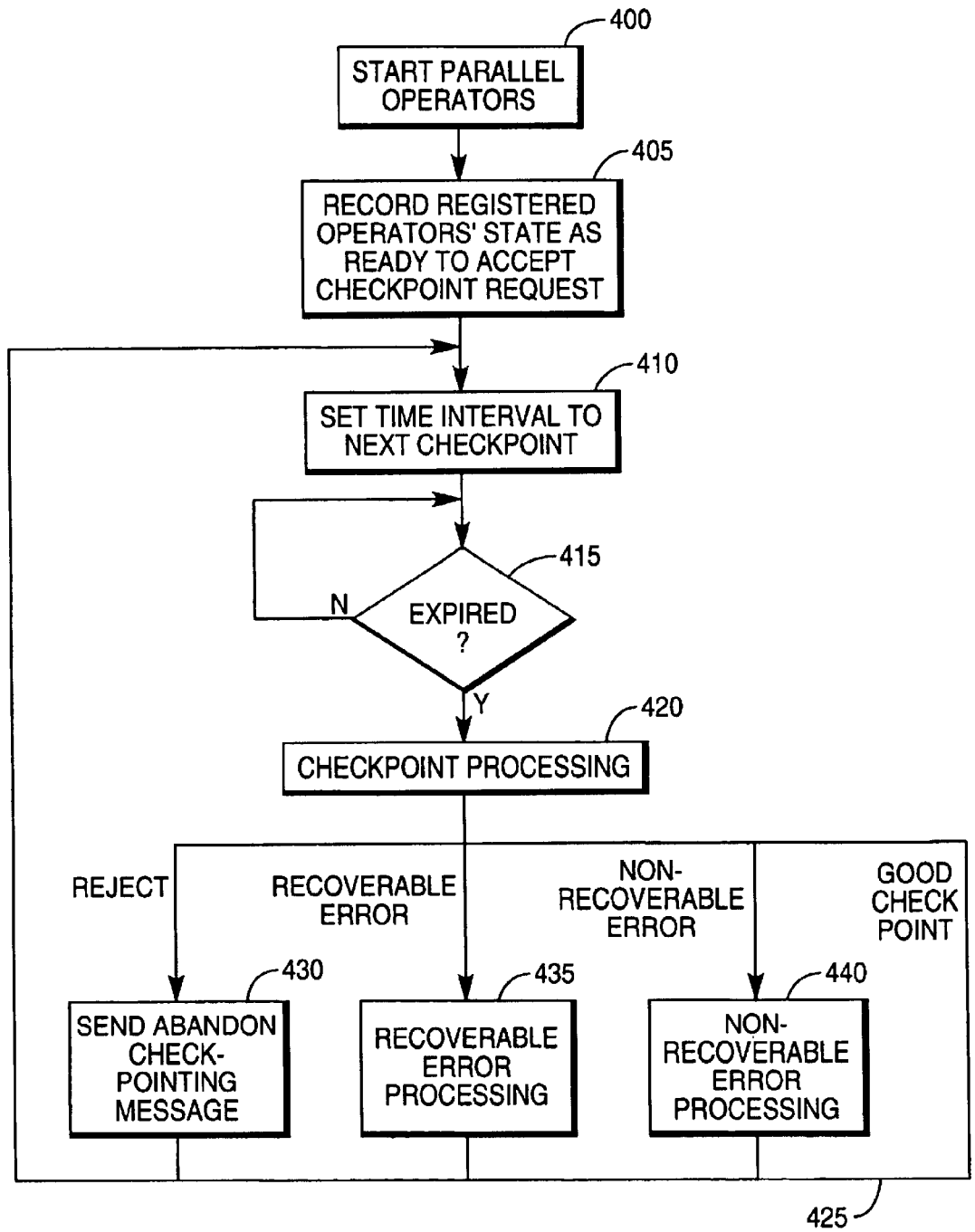
FIG. 4 is a flow chart of checkpoint processing.
Figure 5:
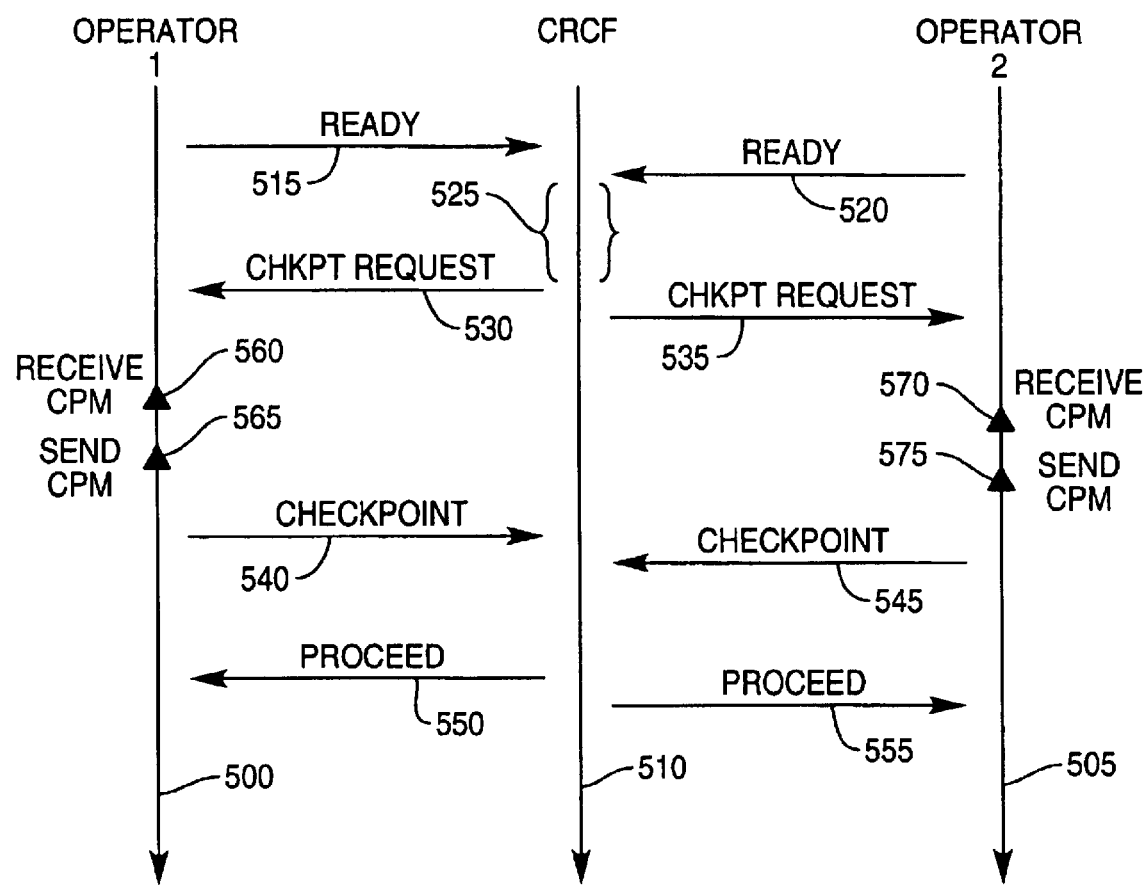
FIG. 5 is a timeline for normal checkpoint processing.

When the utility illustrated in FIG. 3 begins to run (block 400), it records the state of all registered operators as "ready" (block 405), which means that each of the registered operators is ready to accept checkpoint requests, as shown in FIG. 4. An operator becomes registered by sending a ready message to the CRCF, as shown in FIG. 5. FIG. 5 shows parallel timelines 500, 505 and 510 for processing being performed by Operator 1, Operator 2 and the CRCF, respectively, with time increasing with distance toward the bottom of the page. The ready messages 515 and 520 from Operator 1 and Operator 2, respectively, to the CRCF cause Operator 1 and Operator 2 to be registered.

Figure 6:
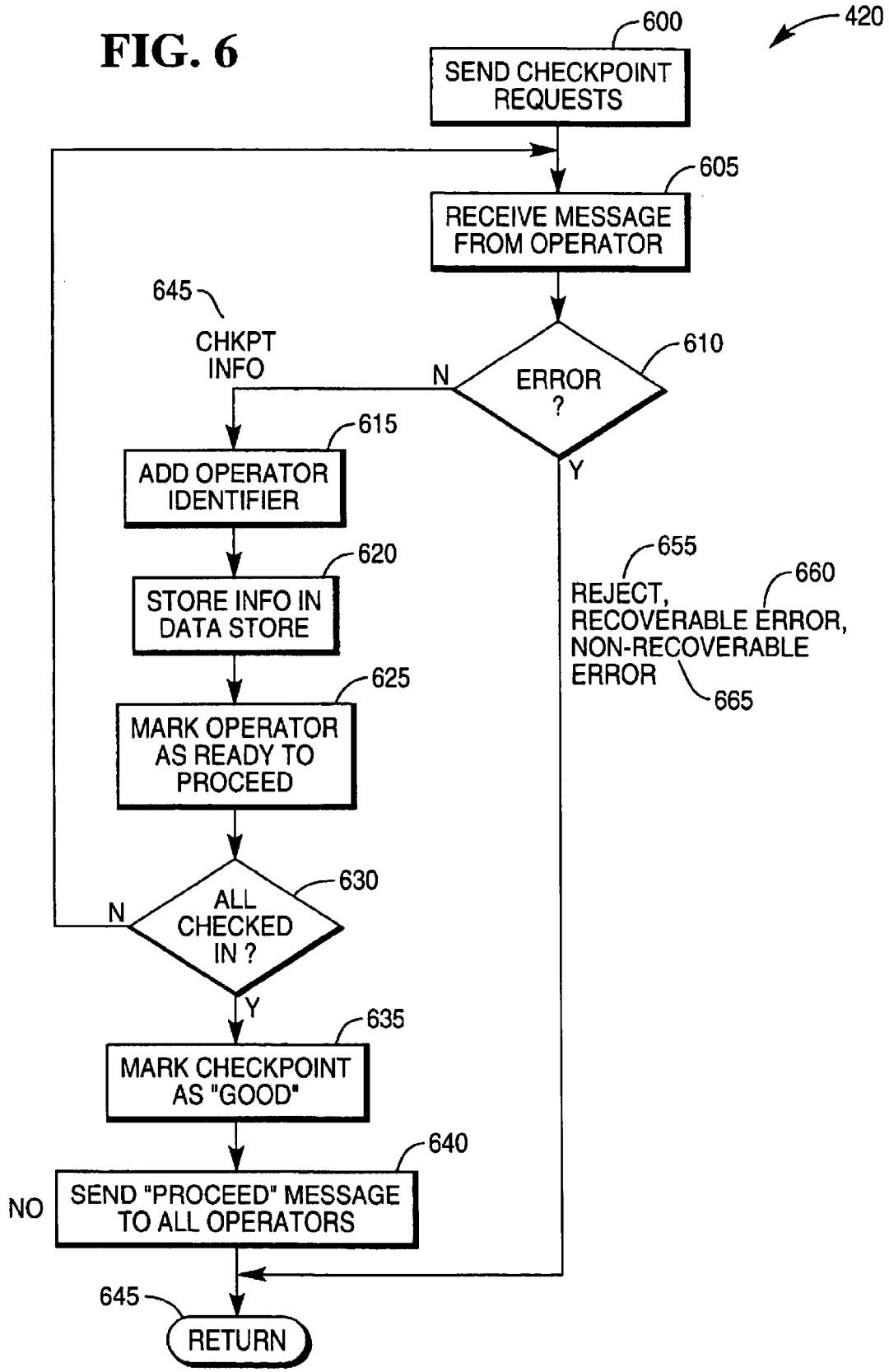
FIG. 6 is a flow chart of the processing of messages related to checkpointing.

Once all of the operators have been registered, the CRCF sets a time interval 525 for the next checkpoint (block 410 in FIG. 4). When the interval expires (block 415), the CRCF initiates checkpoint processing (block 420), as illustrated in FIG. 6. Checkpoint processing begins when the CRCF sends a checkpoint request 530, 535 to every registered operator (block 600). The checkpoint requests 530, 535 are preferably sent asynchronously, as shown in FIG. 5. They may, however, be sent virtually simultaneously.

Assuming they are executing properly, every operator should respond to the checkpoint requests. In a normal situation, each operator will respond with a checkpoint 540, 545 (FIG. 5). The CRCF will store the checkpoint in the checkpoint data store. The CRCF will then schedule another checkpoint and the process will repeat. A checkpoint 540, 545 may include more than one message conveying information from the operator to the CRCF.

The CRCF will receive a message from an operator (block 605 in FIG. 6). The CRCF first determines if the message is an error message (block 610). If it is not, which means that the message includes checkpoint information 645, the CRCF will add information to the message identifying the operator that sent the message (block 615) and store the augmented message in the checkpoint data store (block 620). The CRCF will then mark the responding operator as ready to proceed (block 625), and determine if all of the operators have provided checkpoint information (block 630). If they have not, the CRCR will loop back and wait for a message from another operator. If all of the operators have checked in (block 630), the CRCF will mark the checkpoint as good (block 635), send proceed messages 550, 555 (FIG. 5) to the operators (block 640) and return (block 645).

It is also possible that the CRCF will receive an error message from one of the operators, as shown in FIG. 6. Those messages include reject 655, recoverable error 660, and non-recoverable error 665 messages.

Returning to FIG. 4, if a good checkpoint was received, the CRCF sets a time interval to the next checkpoint (block 410) and the process repeats.

Checkpoint Reject

Figure 7:
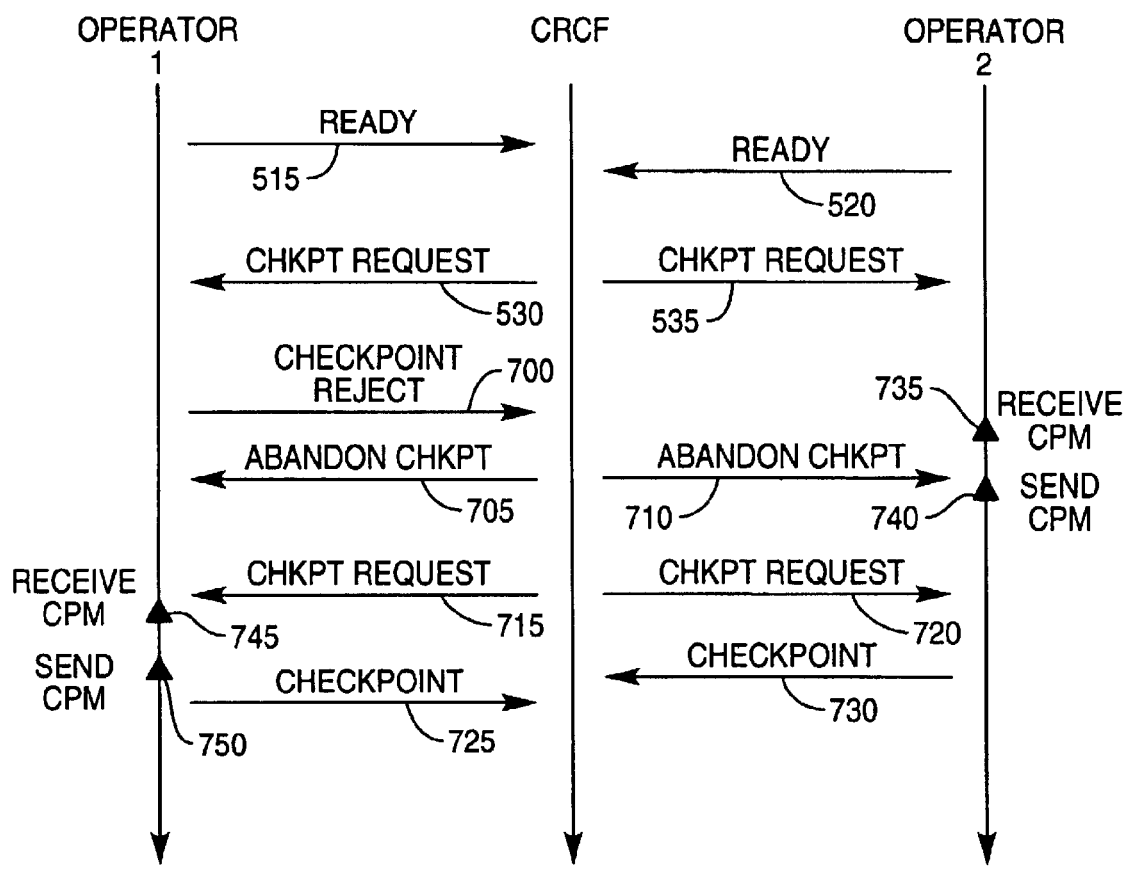
FIG. 7 is a timeline for checkpoint processing when a checkpoint is rejected.

An operator can also reject a checkpointing request if its current state doesn't allow it. In this context, an operator rejects a checkpoint request if it wants to defer checkpoint processing. If any one of the operators rejects the request, by sending a checkpoint reject message 700, checkpoint processing is abandoned, as illustrated in FIG. 7. The CRCF sends an "abandon checkpointing" notification 705, 710 to every operator with instructions to abandon the current checkpoint processing (block 430). The checkpoint is then re-scheduled by setting an interval to the next checkpoint (block 410) and, after the interval expires (block 415), the CRCF resends checkpoint requests 715, 720 (block 600). If none of the operators reject the checkpoint requests, the CRCF proceeds with the next phase of checkpointing and the operators send checkpoint messages 725, 730 to the CRCF.

Figure 8:
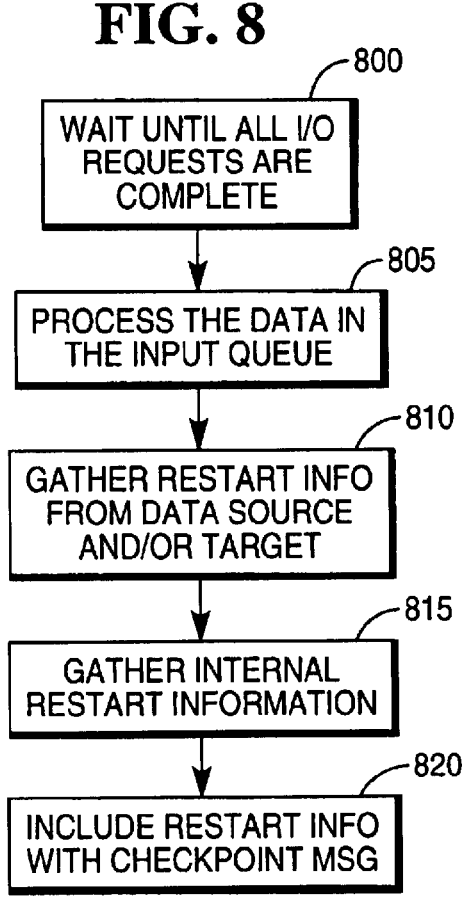
FIG. 8 is a flow chart for a program that issues checkpoints.

The checkpoint request message 530 allows the data access components to achieve an appropriate state before responding to a checkpointing request. For example, an appropriate state may be when all of a producer operator's input/output ("I/O") requests have completed (block 800), as shown in FIG. 8. The producer operator would then process the data already in its input queue or queues (block 805) and then gather restart information from its data source files (block 810), where such data is available, and its own internal restart information (block 815). The producer operator would include this restart information in its checkpointing message (block 820). If an error occurs and the application is restarted, the producer operator could use this restart information to re-position the source file, to allow the processing to resume without causing conflicts. Consumer operators would follow similar procedures.

Checkpoint Partitioning Marks

One particular aspect of checkpoint processing concerns data streams. Since data streams act as shared resources between multiple operators, it is important to ensure that the state of each data stream is perceived consistently by all the operators. Since data streams are asynchronous, an operator that is reading a data stream cannot determine how much more data, if any, it will receive through that data stream. At the same time, the sending operator cannot reliably determine how much data, and when, the receiving operator will read. This means that during checkpointing it is important for the sender to indicate that it has finished sending all the data that should be counted towards the current checkpoint. It also is important for the receiver to know that it has read all the data that should be counted towards the current checkpoint.

Figure 9:
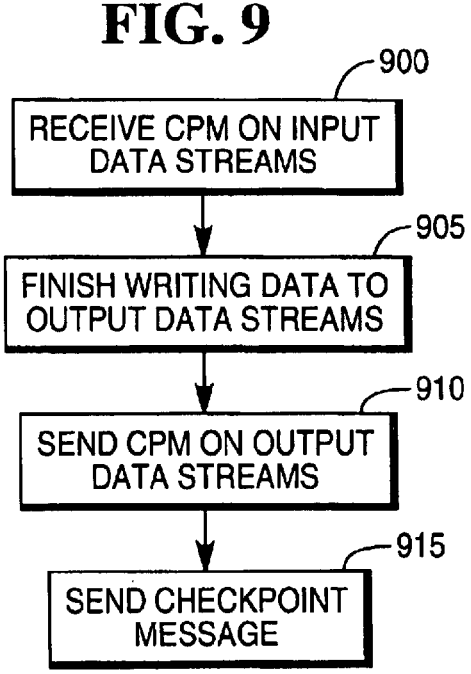
FIG. 9 is a flow chart for a program that uses checkpoint partitioning marks in checkpointing.

In one example, operators that have finished processing all their input data and are ready to checkpoint issue special checkpointing requests against their output data streams. These requests result in special records being written to the data streams, called "checkpoint partitioning marks," or "CPM." An operator would recognize that receipt of a CPM would indicate that the receiving operator had read the last row that must be counted toward the current checkpoint. This means that the receiving operator has processed all the data created by the sending operator and the data stream is in a consistent state. If the receiving operator is otherwise ready to checkpoint, it can do so. If the receiving operator is itself writing data to an output data stream, it will also issue a checkpointing request against the data stream by writing a CPM into that data stream to indicate to the receiving operator on that data stream that it has processed all incoming data. In general, as shown in FIG. 9, an operator cannot complete its checkpoint processing until it has read CPMs from all of its input data streams (block 900), finishes writing data to the output data stream (block 905), and then writes CPMs to all of its output data streams (block 910). Once it finishes this processing, it can send a checkpoint message (block 915). In this manner, checkpoint processing is "cascaded" from one operator to another.

This sequence of events is illustrated in FIGS. 5 and 7. In both figures, Operator 1 and Operator 2 are each assumed to have an input data stream and an output data stream, and are assumed to be connected to the CRCF for the purposes of checkpointing. In the examples shown in FIGS. 5 and 7, Operator 1 and Operator 2 are not connected to the same data stream. After it receives a checkpoint request message 530 from the CRCF, Operator 1 waits until it has received a CPM 560 on its input data stream, completes processing the data in its input buffers, transmits a CPM 565 on its output data stream, and only then sends its checkpoint message 540 to the CRCF. Similarly, after Operator 2 receives a checkpoint request message 535 from the CRCF, it waits until it has received a CPM 570 on its input data stream, completes processing the data in its input buffers, transmits a CPM 575 on its output data stream, and only then sends its checkpoint message 545 to the CRCF.

FIG. 7 illustrates the same concept. Operator 1 receives a checkpoint request 530, which it rejects 700. One reason Operator 1 may reject the checkpoint request is to defer the checkpoint until it receives a CPM on its input data stream. Upon receipt of the reject message, the CRCF sends abandon checkpoint messages 705 and 710 to Operator 1 and Operator 2, respectively. In the example shown in FIG. 7, Operator 2 has received a CPM 735 on its input data stream by the time it receives the abandon checkpoint message 710.

As described above, after it issues the abandon checkpoint messages 705, 710, the CRCF reschedules the checkpoint and, after the next checkpoint interval expires, the CRCF transmits new checkpoint requests 715, 720. Operator 1 waits until it receives a CPM 745 on its input data stream, finishes processing, transmits a CPM 750 on its output data stream, and then transmits its checkpoint message 725. Operator 2, which has already received a CPM 735 and transmitted a CPM 740 by the time the checkpoint request 720 arrives, can transmit its checkpoint message 730 almost immediately.

Once an operator is in a state suitable for checkpointing, it records information about that state by issuing checkpoint information messages 645 (FIG. 6) to the CRCF. Checkpoint message 730, shown in FIG. 7, is an example of such a request. The processing of checkpoint information messages was described above in the discussion of FIG. 6. As illustrated above, the checkpointing process is accomplished asynchronously. This is safe with respect to checkpoint consistency, because it relies on two of the following complementary synchronization mechanisms:

1. The CRCF and its checkpointing protocol, which carries out checkpoint processing by means of dialogs. The dialogs allow the CRCF to control the timing of steps in checkpoint processing.
2. The Asynchronous Data Stream API and the Checkpoint Partitioning Marks. These marks make it possible for operators to exchange checkpoint-related information. Essentially, operators can get limited information about each other's states, without relying on CRCF.

Further, the asynchronous data streams are presumed to be unidirectional, i.e., from a sending operator to a receiving operator, which means that the sending operator will not receive any information from a receiving operator connected to the same data stream. Consequently, a sending operator can complete its checkpoint processing as soon as it has written a CPM to its output data stream or streams. This assumption of unidirectional data flow is especially applicable to database load and unload utilities, which typically transfer data in one direction.

Recoverable Error

If an error occurs anytime during the checkpoint processing, the operator which detects the error notifies the CRCF identifying the error as a recoverable error 655, or a non-recoverable error 660, as shown in FIG. 6. If the error is recoverable 655, the CRCF performs recoverable error processing 435 and if the error is non-recoverable 660, the CRCF performs non-recoverable error processing 440, as shown in FIG. 4.

Figure 10:
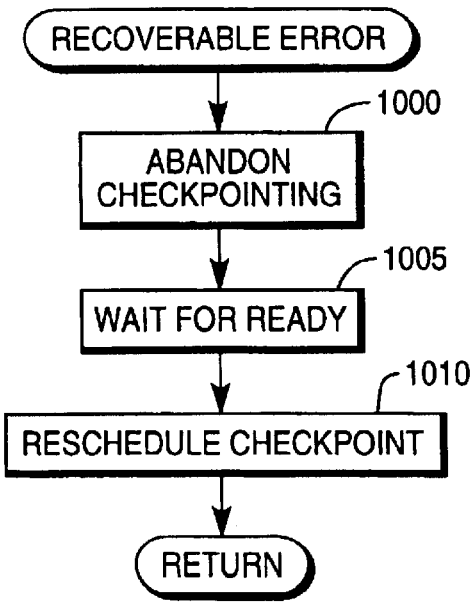
FIG. 10 is a flow chart for processing when a recoverable error occurs.
Figure 11:
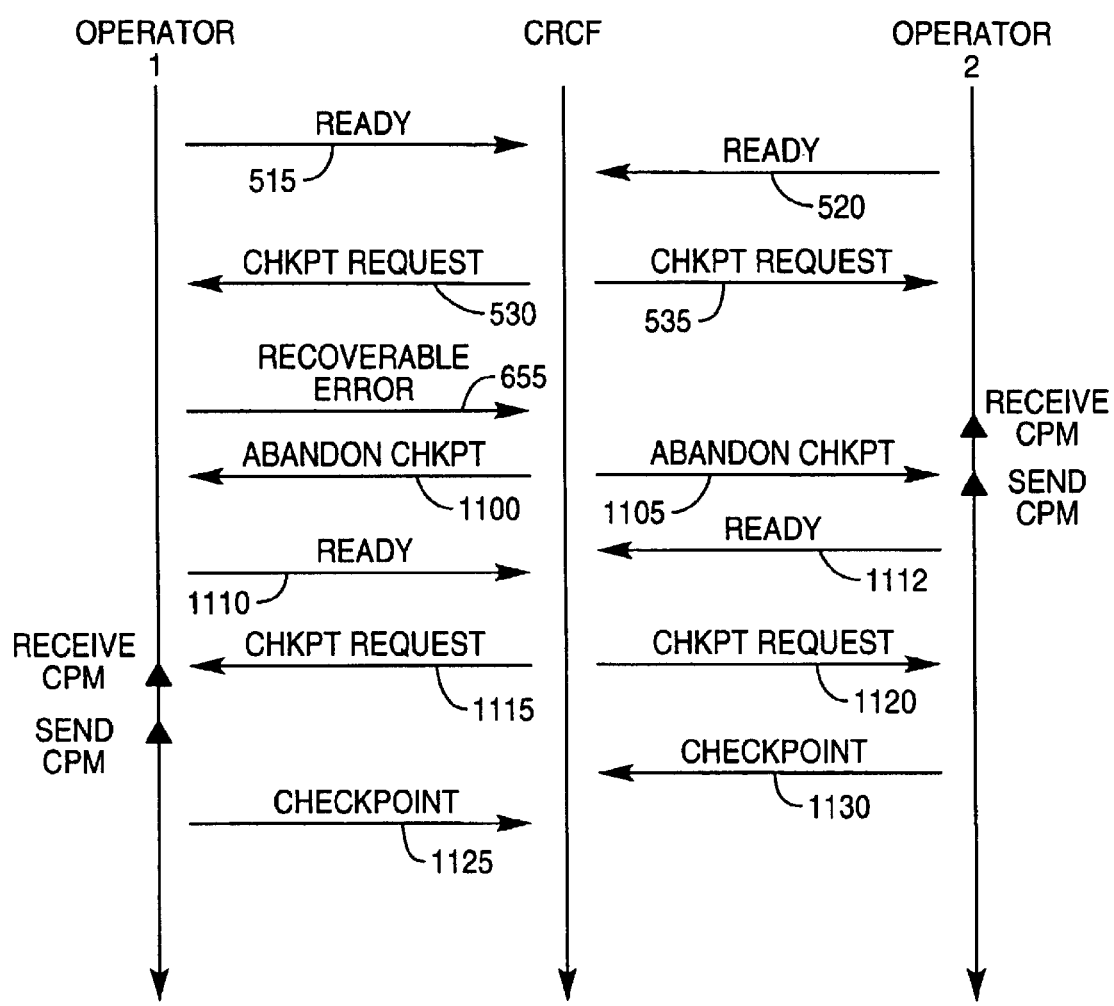
FIG. 11 is a timeline for checkpoint processing when a recoverable error occurs in a program.

In response to a recoverable error, the CRCF abandons the checkpoint processing already in progress (block 1000), as shown in FIG. 10. It does so by sending "abandon checkpoint" requests 1100 and 1105 to every operator, as shown in FIG. 11. The CRCF then waits for the each operator to respond with a "ready" message 1110, 1112 (block 1005, FIG. 10). The CRCF then reschedules the checkpoint (block 1005, FIG. 10) and, at the scheduled time, sends checkpoint request messages 1115, 1120 (FIG. 11) to the registered operators, which respond with checkpoint messages 1125, 1130.

Non-Recoverable Error

Figure 12:
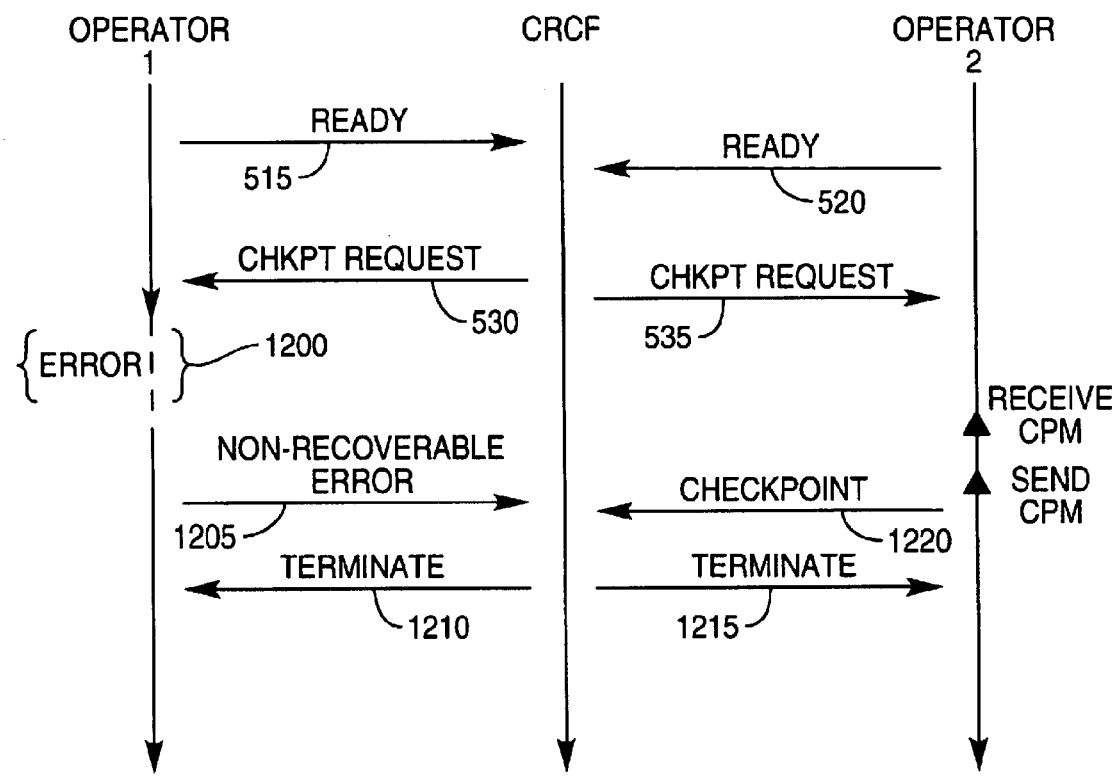
FIG. 12 is a timeline for checkpoint processing when a non-recoverable error occurs in a program.

An operator may experience a non-recoverable error at any point during its processing, as illustrated in FIG. 12. In FIG. 12, Operator 1 and Operator 2 have sent ready messages 515, 520 to the CRCF, and the CRCF has responded with checkpoint requests 530, 535, when the error 1200 occurs in Operator 1. When Operator 1 revives, it sends a non-recoverable error message 1205 to the CRCF. When the CRCF receives a message indicating that an operator has experienced a non-recoverable error, it will send "terminate" messages 1215, 1220 to the registered operators (block 1300, FIG. 13) which causes the registered operators to terminate processing.

Restart

Figure 13:
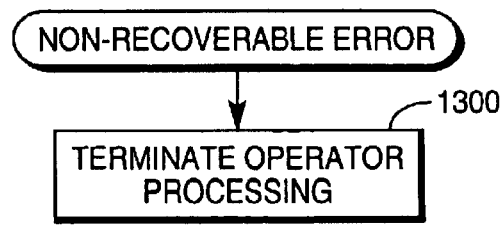
FIG. 13 is a flow chart for checkpoint processing when a non-recoverable error occurs in a program.
Figure 14:
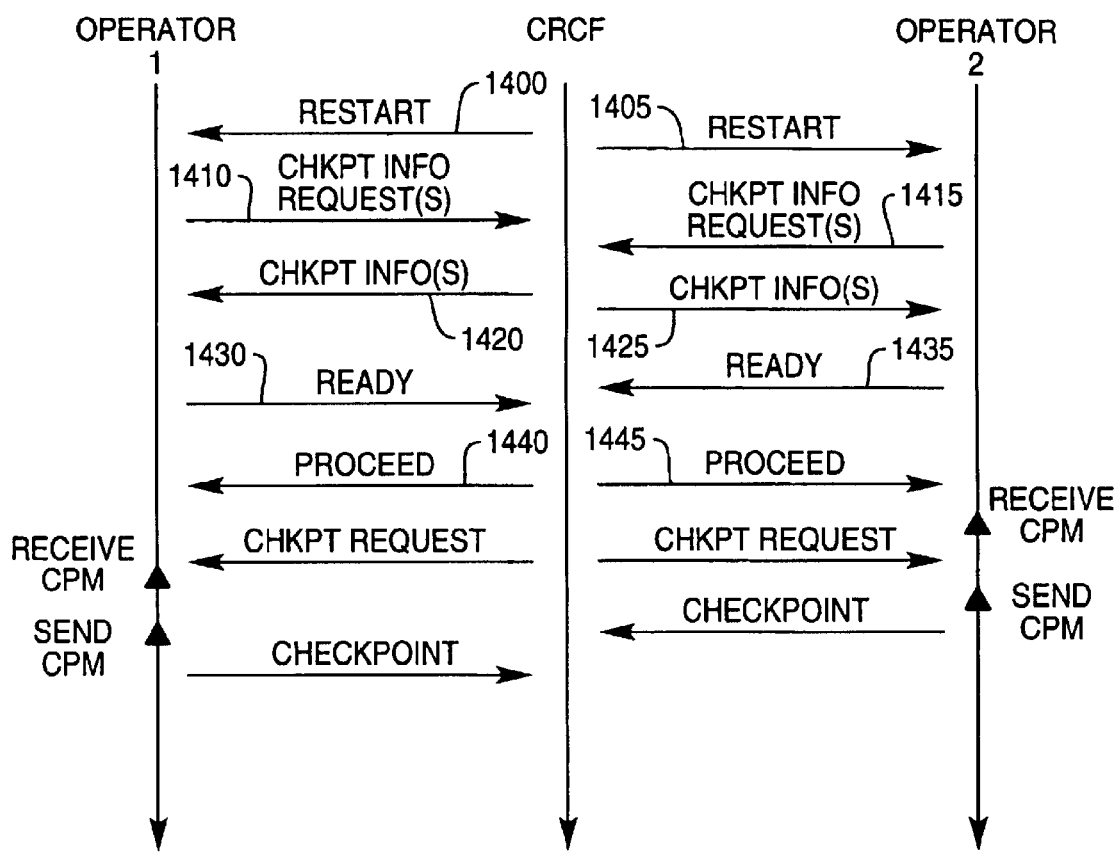
FIG. 14 is a restart timeline.

If a parallel program terminates because of a non-recoverable error, as shown in FIGS. 12 and 13, it may be possible to restart the parallel program. Typically, however, before the restart can be accomplished, the problem that caused the non-recoverable error is remedied. For example, if the job control language ("JCL") controlling a database load or unload was incorrect or improperly formatted, the operator should correct the JCL before attempting a restart. In one implementation, the restart operation is requested by adding a "restart" switch to the appropriate JCL command. As a consequence, the CRCF will issue restart requests 1400, 1405 to the operators, such as Operator 1 and Operator 2, as shown in FIG. 14.

Figure 15:
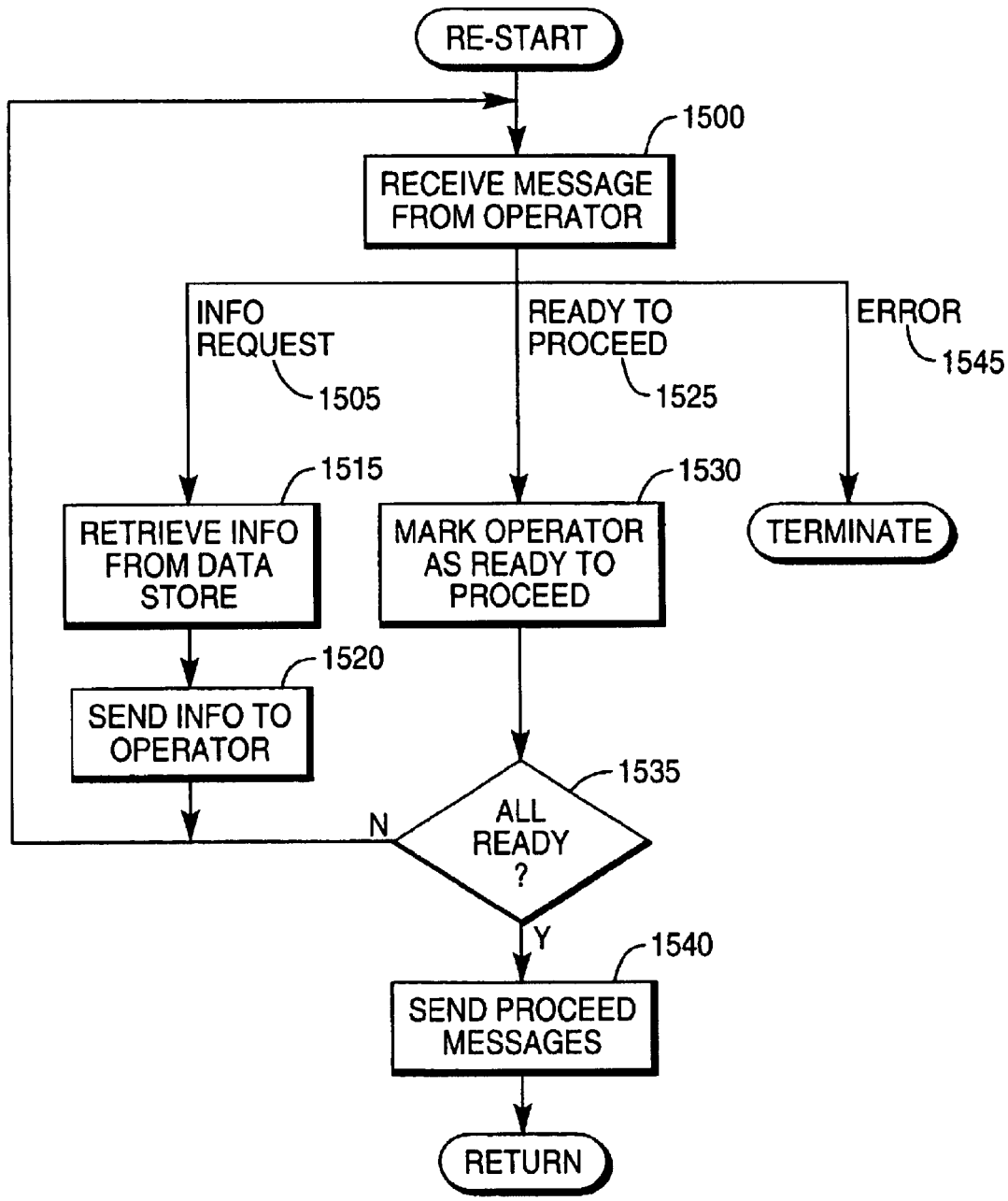
FIG. 15 is a restart flow chart.

When Operator 1 and Operator 2 receive the restart requests 1400, 1405, they will seek to restore their state to that described in the most recent good checkpoint. The operators send requests 1410, 1415 to the CRCF to get information recorded during the most recent good checkpoint. When the CRCF receives an message from an operator (block 1500), as shown in FIG. 15, and recognizes it as an information request 1505, it retrieves the requested information from an external source (block 1515) and passes it to the operator (block 1520) using checkpoint information messages 1420, 1425. An operator can issue multiple requests 1420, 1425 if it had previously saved multiple pieces of information as part of its checkpoint.

Once an operator has restored its state, it is ready to resume processing. It sends the CRCF a notification 1430, 1435 that it is ready to proceed When the CRCF receives a "ready to proceed" message 1525 from an operator, it marks the operator as ready to proceed (block 1530). The CRCF waits until it receives such a message from every registered operator (block 1535). After that, it sends out notifications 1440, 1445 to the operators, allowing them to proceed (block 1540). At this point the restart processing is finished and the CRCF begins scheduling checkpoints.

If an error occurs anytime during the restart processing, the operator that detects an error notifies the CRCF. Upon receipt of an error message 1545, the CRCF cancels the entire restart by sending out "abandon restart" requests to the parallel operators. In response to these messages, the entire application terminates. In essence, the restart processing is "pessimistic," i.e., it assumes that until and unless all the operators are ready to restart, application processing cannot be resumed.

Figure 16:
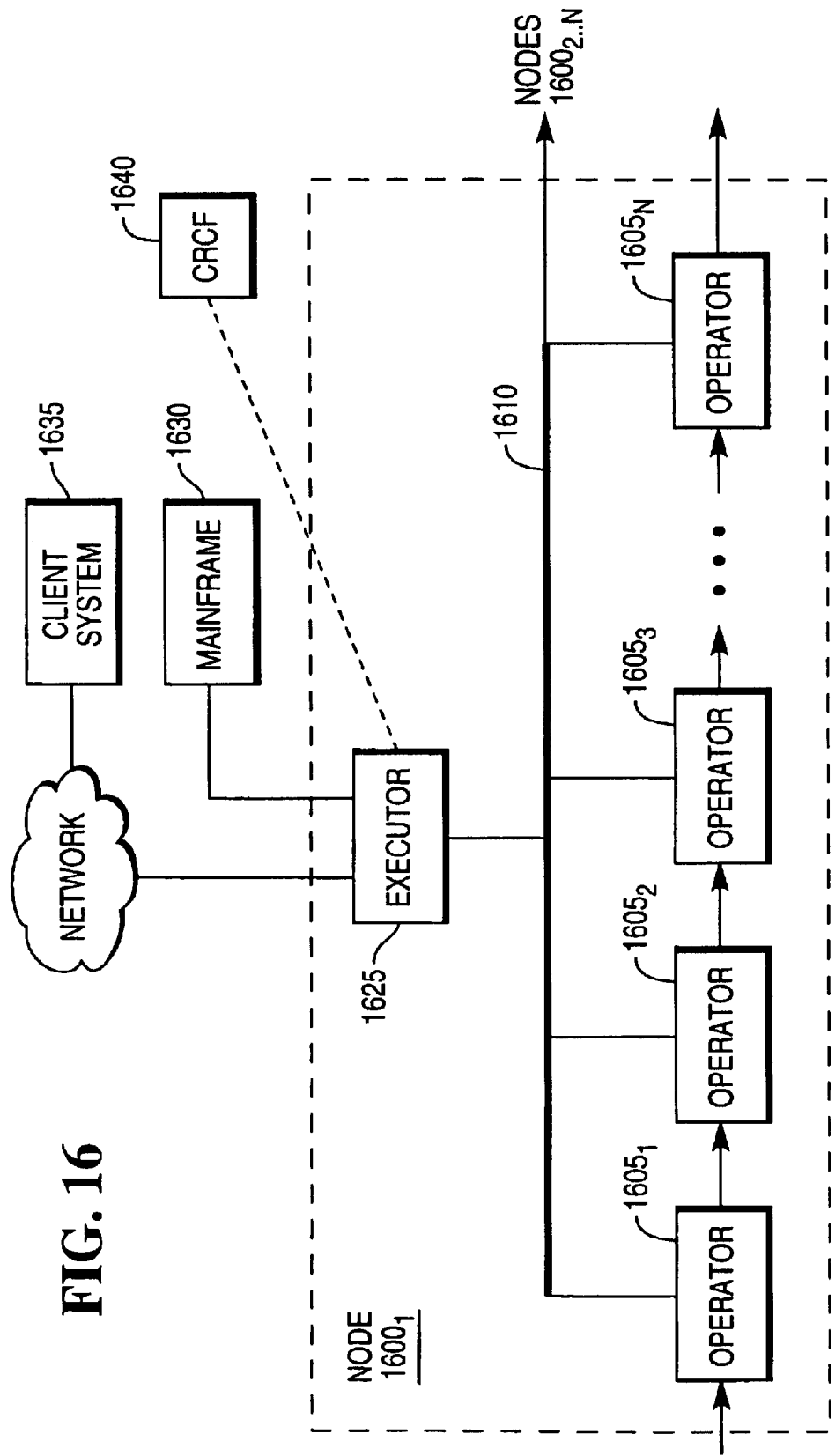
FIG. 16 is a block diagram of a parallel processing system.

An example architecture for a system capable of checkpointing as described above with very large databases using a parallel database system, such as a Teradata Active Data Warehousing System available from NCR Corporation, is illustrated in FIG. 16. FIG. 16 shows a sample architecture for one node $1600_1$ of the DBS. The architecture can be extended with additional nodes, $1600_{2 \ldots N}$. The DBS node $1600_1$ includes one or more executors 1625, each of which manages one or more operators $1605_{1 \ldots N}$, connected by a network 1610. Each of the operators $1605_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on a M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the operators $1605_{1...N}$ has a certain purpose and carries out a particular function necessary within the overall database loading or unloading task. A load task may include multiple operators, each one capable of executing independently and in parallel with other operators. An asynchronous data stream facility that inter-connects the operators, shown on the diagram as arrows between the operators, enables parallelism for operators that share data. As a result of this arrangement, many operations within the load or unload task can be performed simultaneously and in parallel, resulting in reduction of the overall execution time.

The CRCF 1640 controls the operation of the executor 1625. The CRCF may run on one or more physical processors or it may be a virtual processor running on more than one physical processors.

Parallel DBMS Load Utilities have the following advantages over conventional, single-process sequential utilities:

Parallel DBMS Utilities achieve better throughput, which results in reduced execution time. Parallel Utilities are scalable—they can take advantage of available resources to accommodate increases in workload.

Checkpointing makes it possible to reduce re-run times. In the worst case, these times would not exceed the checkpointing interval.

The reduction in execution time is especially useful for operators with lengthy execution times, such as DBMS utilities which handle large volumes of data. It makes it possible for such utilities to load more data in the same amount of time. It also means that computing resources can be reassigned to other work more quickly than with conventional DBMS load utilities.

The integrated Checkpoint and Restart Coordination Facility and its API simplify the design and development of parallel utility programs. This results in a lower cost of development.

The various implementations of the invention are realized in electronic hardware, computer software, or combinations of these technologies. Most implementations include one or more computer programs executed by a programmable computer. In general, the computer includes one or more processors, one or more data-storage components (e.g. volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copies into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

What is claimed is:

1. A method for reducing the restart time for a parallel application, the parallel application including a plurality of parallel operators, the method comprising:

repeating the following;
setting a time interval to a next checkpoint;
waiting until the time interval expires;
sending checkpoint requests to each of the plurality of parallel operators; and
receiving and processing messages from one or more of the plurality of parallel operators;
wherein receiving and processing messages from one or more of the plurality of parallel operators comprises:
receiving a checkpoint reject message from one of the plurality of parallel operators;
sending abandon checkpointing messages to the plurality of parallel operators; and
scheduling a new checkpoint.

2. A method for reducing the restart time for a parallel application, the parallel application including a plurality of parallel operators, the method comprising:

repeating the following;
setting a time interval to a next checkpoint;
waiting until the time interval expires;
sending checkpoint request to each of the plurality of parallel operators; and
receiving and processing messages from one or more of the plurality of parallel operators;
wherein receiving and processing messages from one or more of the plurality of parallel operators comprises:
receiving a recoverable error message from one or more of the plurality of parallel operators;
sending abandon checkpointing messages to the plurality of parallel operators;
waiting for ready messages from all of the plurality of parallel operators; and
scheduling a new checkpoint.

3. A method for one of a plurality of parallel operators to record its state, the method of comprising:

receiving a checkpoint request message on a control data stream;
waiting to enter a state suitable for checkpointing;
sending a response message on the control data stream; and
determining that the parallel operator is not in a state suitable for checkpointing;
wherein sending a response message on the control data stream comprises sending a checkpoint reject message on the control data stream.

4. The method of claim 3 further comprising: experiencing a recoverable error; and wherein sending a response message on the
control data stream comprises sending a recoverable error message on the control data stream.

5. The method of claim 3 further comprising:

experiencing a non-recoverable error; and wherein sending a response message on the control data stream comprises sending a non-recoverable error message on the control data stream.

6. A computer program, stored on a tangible storage medium, for use in reducing the restart time for a parallel application, the application comprising a plurality of parallel operators, the computer program comprising:

a CRCF component which includes executable instructions that cause a computer to repeat the following;
set a time interval to a next checkpoint;
wait until the time interval expires;
send checkpoint requests to the plurality of parallel operators;
receive and process messages from one or more of the plurality of parallel operators; and a plurality of parallel components, each of which is associated with one of the plurality of parallel operators, and each of which includes executable instructions that cause a computer to;
receive a checkpoint request message from the CRCF;
wait to enter a state suitable for checkpointing; and
send a checkpoint response message to the CRCF;

wherein each of the parallel components include executable instructions that cause a computer to:

determine that the parallel operator is not in a state suitable for checkpointing;
and, in sending a response message to the CRCF, the parallel component associated with that parallel operator causes the computer to send a checkpoint reject message to the CRCF; and in receiving and processing messages from one or more of the plurality of parallel operators the CRCF causes the computer to:
receive the checkpoint reject message; and
send abandon checkpoint messages to the plurality of parallel operators in response to the checkpoint reject message.

7. A computer program stored on a tangible storage medium, for use in reducing the restart time for a parallel application, the parallel application comprising a plurality of parallel operators, the computer program comprising:

a CRCF component which includes executable instructions that cause a computer to repeat the following:
set a time interval to a next checkpoint;
wait until the time interval expires;
send checkpoint requests to the plurality of parallel operators;
receive and process messages from one or more of the plurality of parallel operators; and a plurality of parallel components, each of which is associated with one of the plurality of parallel operators, and each of which includes executable instructions that cause a computer to;
receive a checkpoint request message from the CRCF;
wait to enter a state suitable for checkpointing; and
send a checkpoint response message to the CRCF;

wherein each of the parallel components include executable instructions that cause a computer to:

determine that one or more of the parallel operators has experienced a recoverable error; and, in sending a response message to the CRCF,
the parallel component or components associated with the one or more parallel operators that experienced the recoverable error or errors cause the computer to:
send a recoverable error message to the CRCF;
proceed with recovery; and
send a ready message to the CRCF; and in receiving and processing messages from one or more of the plurality of parallel operators, the CRCF causes the computer to:
receive the recoverable error message; send abandon checkpoint messages to the plurality of parallel operators in response to the recoverable error message;
wait for the ready messages;
receive the ready messages; and
schedule a checkpoint.

* * * * *